US011982559B2

(12) United States Patent
Helle et al.

(10) Patent No.: US 11,982,559 B2
(45) Date of Patent: May 14, 2024

(54) COUPLING MEMBER FOR CLAMP ON FLOW METERING

(71) Applicant: Labtrino AB, Stockholm (SE)

(72) Inventors: Thibault Helle, Stockholm (SE); Ramtin Massoumzadeh, Stockholm (SE)

(73) Assignee: LABTRINO AB, Stockholm (SE)

( * ) Notice: Subject to any disclaimer, the term of this patent is extended or adjusted under 35 U.S.C. 154(b) by 392 days.

(21) Appl. No.: 17/426,990

(22) PCT Filed: Jan. 29, 2020

(86) PCT No.: PCT/EP2020/052091
§ 371 (c)(1),
(2) Date: Jul. 29, 2021

(87) PCT Pub. No.: WO2020/157092
PCT Pub. Date: Aug. 6, 2020

(65) Prior Publication Data
US 2022/0113175 A1 Apr. 14, 2022

(30) Foreign Application Priority Data

Jan. 30, 2019 (SE) .................... 1950109-7

(51) Int. Cl.
*G01F 15/18* (2006.01)
*G01F 1/66* (2022.01)
(Continued)

(52) U.S. Cl.
CPC ............ *G01F 15/185* (2013.01); *G01F 1/662* (2013.01); *G01F 1/667* (2013.01); *G01F 25/10* (2022.01);
(Continued)

(58) Field of Classification Search
CPC ........ G01F 1/662; G01F 1/667; G01F 15/185; G01F 25/10; G01P 5/24; G01N 29/28;
(Continued)

(56) References Cited

U.S. PATENT DOCUMENTS 3,663,842 A 5/1972 Miller
4,454,767 A 6/1984 Shinkai et al.
(Continued)

FOREIGN PATENT DOCUMENTS

CN 203024809 U 6/2013
CN 207649692 U * 7/2018
(Continued)

OTHER PUBLICATIONS

TIPO, Search Report for Taiwan Application No. 2020800151630 dated Jun. 27, 2023, 2 pages.
(Continued)

*Primary Examiner* — Stephanie E Bloss
*Assistant Examiner* — Kevin C Butler
(74) *Attorney, Agent, or Firm* — Brad J. Thorson; DeWitt LLP (57) ABSTRACT

The present disclosure relates to a coupling member (20) for a flow metering device, the coupling member (20) being configured for acoustically coupling an ultrasonic transducer (26) to a fluid conduit (90), wherein the coupling member comprises a first face (22) adapted to be connected to an ultrasonic transducer (26) and a second face (24) adapted to be connected to a fluid conduit. At least one sidewall (30) connects the first and second faces (22, 24), wherein the at least one sidewall (30) comprises a recess (40) extending from the second face (24).

18 Claims, 10 Drawing Sheets

(51) Int. Cl.
    *G01F 1/667* (2022.01)
    *G01F 25/10* (2022.01)
    *G01N 29/22* (2006.01)
    *G01N 29/28* (2006.01)
    *G01P 5/24* (2006.01)
    *G10K 11/02* (2006.01)

(52) U.S. Cl.
    CPC ........... *G01N 29/223* (2013.01); *G01N 29/28* (2013.01); *G01N 2291/0422* (2013.01); *G01N 2291/044* (2013.01); *G01P 5/24* (2013.01); *G10K 11/02* (2013.01)

(58) Field of Classification Search
    CPC ........... G01N 29/223; G01N 2291/044; G01N 2291/0422; G10K 11/02
    USPC .......................................................... 73/644
    See application file for complete search history.

(56) References Cited

U.S. PATENT DOCUMENTS

| | | | |
|---|---|---|---|
| 5,437,194 A | 8/1995 | Lynnworth | |
| 5,463,906 A * | 11/1995 | Spani | A61B 8/06 73/861.27 |
| 7,523,677 B2 | 4/2009 | Wiest et al. | |
| 8,490,498 B2 * | 7/2013 | Wiest | G01F 1/667 73/861.28 |
| 8,635,913 B2 * | 1/2014 | Ao | G01F 1/668 73/644 |
| 9,574,924 B2 * | 2/2017 | Allen | G01F 15/14 |
| 9,671,263 B2 | 6/2017 | Otsu et al. | |
| 2003/0172743 A1 | 9/2003 | Ao et al. | |
| 2006/0123922 A1 | 6/2006 | Froehlich et al. | |
| 2008/0276724 A1 * | 11/2008 | Straub, Jr. | G01F 1/667 73/861.18 |
| 2011/0239780 A1 | 10/2011 | Berger et al. | |
| 2012/0266679 A1 | 10/2012 | Ao et al. | |
| 2014/0076062 A1 | 3/2014 | Bober et al. | |
| 2018/0149511 A1 | 5/2018 | Ploss et al. | |
| 2022/0113175 A1 * | 4/2022 | Helle | G01F 1/667 |

FOREIGN PATENT DOCUMENTS

| | | | | |
|---|---|---|---|---|
| CN | 207649692 U | | 7/2018 | |
| DE | 102007039016 A1 * | | 2/2009 | ............ G01F 1/662 |
| DE | 102007039016 A1 | | 2/2009 | |
| DE | 102008055165 A1 * | | 7/2010 | ............ G01F 1/662 |
| DE | 102008055165 A1 | | 7/2010 | |
| DE | 102015107753 A1 * | | 11/2016 | ............ G01F 1/662 |
| EP | 0974815 A1 | | 1/2000 | |
| EP | 1173733 B1 * | | 5/2011 | ............ G01F 1/662 |
| GB | 2504297 A * | | 1/2014 | ............ G01F 1/662 |
| JP | 3999203 B2 * | | 10/2007 | ............ G01F 1/667 |
| JP | 3999203 B2 | | 10/2007 | |
| KR | 20120108001 A * | | 10/2012 | ............... G01F 1/66 |
| KR | 101693726 B1 * | | 1/2017 | ............ G01B 17/00 |
| WO | WO-2014016315 A1 * | | 1/2014 | ............ G01F 1/662 |
| WO | 2014021846 A1 | | 2/2014 | |
| WO | WO-2014021846 A1 * | | 2/2014 | ............ G01F 1/667 |
| WO | 2016180629 A1 | | 11/2016 | |
| WO | 2016184648 A1 | | 11/2016 | |
| WO | WO-2020157092 A1 * | | 8/2020 | ............... G01F 1/66 |

OTHER PUBLICATIONS

International Search Report for PCT/EP2020/052091 dated May 4, 2020, 3 pages.

International Search Report and Written Opinion for PCT/EP2020/052091 dated May 4, 2020, 15 pages.

Swedish Technical Notice, Swedish Search Report for Patent Application No. 1950109-7 dated Jul. 29, 2019, 8 pages.

* cited by examiner

COUPLING MEMBER FOR CLAMP ON FLOW METERING

CROSS-REFERENCED TO RELATED APPLICATIONS

This application claims priority from Application PCT/EP2020/052091, filed Jan. 29, 2020, and claims priority from Swedish Patent Application No. 1950109.7, filed Jan. 30, 2019, which is deemed incorporated by reference in its entirety in this application.

STATEMENT REGARDING FEDERALLY SPONSORED RESEARCH OR DEVELOPMENT

Not applicable.

BACKGROUND OF THE INVENTION

The present disclosure relates to a coupling member for a flow metering device, particularly but not exclusively, for clamp on flow metering devices. The disclosure further relates to a clamp on flow metering device including the coupling member of the present disclosure. Other aspects of the present disclosure relate to a method for manufacturing a flow metering device including a coupling member.

Fluid flow measurement is required in a variety of applications, such as gas and water supply measurements used by energy suppliers. Depending on the environmental conditions and the characteristics of the fluid to be measured, there are multiple ways of metering a fluid flow. Some flow measurement devices, such as mechanical flow meters, are in direct contact with the fluid to be measured and therefore influence the fluid flow, at least to some extent. Other flow measurement devices do not interact with the fluid and may thus be considered to be non-invasive. Examples for such non-invasive flow meters are magnetic, optical, or ultrasonic flow meters.

The present disclosure relates to coupling members for non-invasive flow metering devices, particularly ultrasonic flow meters. Ultrasonic flow meters utilize the fact that sound waves move faster when traveling in the same direction as a flowing medium, and slower when traveling against the flow. This principle is not only used to accurately measure the flow of liquids and gases but also helps derive parameters like density and viscosity of the flowing medium.

Ultrasonic flow meters use one of two measurement principles, namely transit-time versus Doppler effect measurements. Doppler effect flow meters include a continuous ultrasonic wave transmitter, and a receiver detecting parts of the continuous ultrasonic waves that are scattered from particles suspended in the fluid medium. The received ultrasonic wave has a frequency shift (Doppler frequency shift), which is directly proportional to the flow.

In transit-time flow measurement, a pair of ultrasonic transducers is used where both function as a transmitter as well as the receiver. The flow meter operates by alternately transmitting and receiving bursts of ultrasonic waves between the two transducers and measuring the transit time for set waves to travel between the two transducers. Ultrasonic waves traveling with the fluid flow will result in shorter transit times, whereas waves traveling against the flow will have longer transit times. The difference in the transit time measured is directly proportional to the velocity of the fluid in the pipe.

The transducers for transit-time flow meters can be mounted to the fluid conduit in various different ways, all of which include at least a pair of transducers that are offset from each other along the flow axis of the fluid conduit. Three main arrangements that can be utilized in flow measurements are the "Z-method", the "V-method", and the "W-method". In the "Z-method", the two transducers are mounted on opposite sides of the pipe and the sound pulses cross the pipe flow once. This method can be used for larger pipe sizes.

With the "V-method" and the "W-method", the two transducers are mounted on the same side of the pipe and the sound pulse is reflected on the opposite of the pipe, such that the sound pulse crosses the pipe twice (V-method) or four times (W-method) before reaching the respective other transducer.

Figure 1:
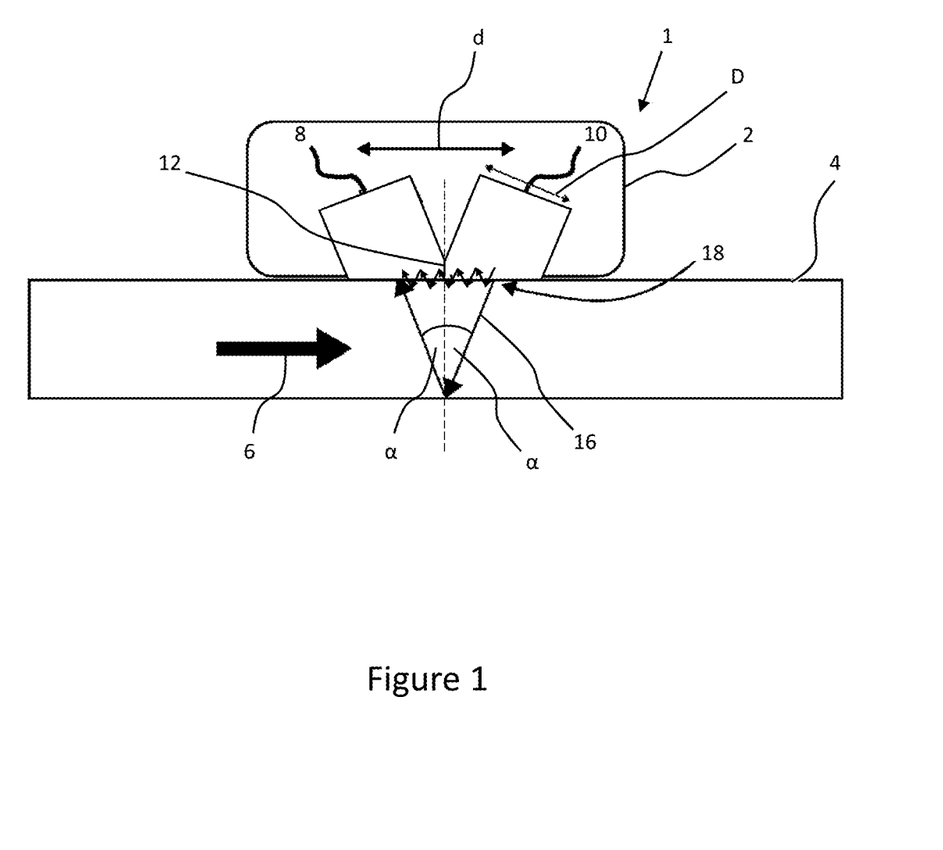
FIG. 1 shows a schematic cross section of a flow metering device comprising a V-arrangement known in the art.

A schematic view of a flow metering device set-up according to the V-method is shown in FIG. 1. The flow metering device 1 includes a housing 2, which is attached to a fluid conduit 4 for measuring a corresponding fluid flow 6 within said conduit 4. The flow measurement device 1 comprises a first ultrasonic transducer 8 and a second ultrasonic transducer 10 received within the housing 2. Both the first and second ultrasonic transducers 8 and 10 are configured to transmit and receive ultrasonic waves.

The first and second ultrasonic transducers 8 and 10 are coupled to the fluid conduit 4. A contact gel (not shown) is typically provided between an outer surface of the fluid conduit 4 and the transducers 8, 10 to avoid air gaps between the transducers 8,10 and said outer surface of the fluid conduit 4. By eliminating air gaps between the transducers 8,10 and the fluid conduit 4, inadvertent signal losses can be reduced.

FIG. 1 shows a first sound path 16 of an ultrasonic wave traveling from the second transducer 10 towards the first transducer 8. As is directly derivable from FIG. 1, the signal path 16 is substantially V-shaped. The sound signal enters the fluid conduit 4 at the top surface of the fluid conduit 4, as is shown in FIG. 1, and propagates through the pipe until it is reflected by an opposite, lower end of the fluid conduit 4, The signal is then reflected back towards the first transducer 8. It should be noted that the angle α, at which the ultrasonic signal impacts the lower end of the fluid conduit 4, is usually predetermined and important for effective flow measurement. Another constant is the diameter D of the transducers 8 and 10. The diameter D is usually set by the strength of the ultrasonic wave signal required, which in turn is dependent on the type of fluid measured. With the angle α and diameter D being fixed, a distance d between the first and second transducers mainly depends on the diameter of the fluid conduit 4. Accordingly, fluid conduits with smaller diameters result in a shorter distance d, whereas fluid conduits with a larger diameter require an increased distanced between the two transducers 8, 10. Yet, it should be noted that transducers that are arranged at a fixed distance d may still be used to measure fluid conduits of various diameters, e.g. within a range of 10 mm.

Particularly when measuring fluid conduits of smaller diameters, such as the one shown in FIG. 1, the distance d between the first and second transducers reduces so much that the transducers 8, 10 contact each other in the centre 12, between the first and second transducers 8, 10. Such contact can result in a significant increase of crosstalk between the first and second transducers 8 and 10. Such crosstalk results in noise signals 18 created by sound waves traveling along the outer surface of the fluid conduit, directly between the first and second transducers 8, 10. Noise signals 18, therefore, do not cross the flow conduit. Of course, said noise signals 18 will reduce the quality of the ultrasonic signal 16 used for flow measurement and thus should be avoided or reduced.

In view of the aforementioned problem, it is an object of one or more embodiments of the present disclosure to reduce inadvertent crosstalk between the transducers, even when measuring on small diameter fluid conduits.

Aspects and embodiments of the disclosure provide a coupling member fora flow metering device and a flow metering device as claimed in the appendant claims.

According to a first aspect of the present disclosure, there is provided a coupling member for a flow metering device, the coupling member being elastic and configured for acoustically coupling an ultrasonic transducer to a fluid conduit. The coupling member comprises a first face adapted to be connected to an ultrasonic transducer and a second face adapted to a be connected to a fluid conduit. The coupling member further comprises at least one sidewall connecting the first and second faces, wherein the at least one sidewall comprises a first recess extending from the second face.

The coupling member of the present invention provides an interface between corresponding transducers and the fluid conduit that helps to reduce reflection of the acoustic wave signal produced by the transducers on the outer surface of the fluid conduit. The coupling member is also elastic. Producing the coupling member in an elastic form (e.g. by using elastic materials to form the coupling member) reduces the chance of air gaps being created between the transducers and the outer surface of the fluid conduit.

This is particularly the case if the coupling members are used in clamp on flow metering devices, in which the coupling members are squeezed onto the outer surface of the fluid conduit. The elastic coupling member also reduces the likelihood of inadvertent displacement of the latter under operation, thanks to its increased friction on the pipe wall. The coupling member of the present disclosure removes the requirement of adding a contact gel, grease, epoxy or glue between the transducers and the outer surface of the fluid conduit. The elastic coupling member may be configured such that the coupling member will elastically deform when in use. In particular, the elasticity of the coupling member may be chosen such that the coupling member will deform under a force that pushes/squeezes the coupling member onto the outer surface of a corresponding fluid conduit. Such deformation can reduce, and potentially eliminate, any air gap between the coupling member and the outer surface of the fluid conduit.

The recess arranged on the sidewall and extending from the second face can be used to create an attenuating air gap between adjacent coupling members when used in a corresponding flow meter, particularly in V-method ultrasonic flow meters, even when applied to flow tubes of very small diameter, such as diameters of 15 mm or less.

As will be described in more detail below, contact between sidewalls of two adjacent coupling members, along their respective second faces, could create inadvertent or undesired contact between two coupling members. Adding a recess to the sidewall along the second face of the coupling member will help to avoid said contact and create an air gap, which acts to attenuate noise signals/crosstalk between the first and second transducers.

The recess may have any shape or form. For example, it may be in the form of any one or more of a flat, concave, stepped, straight or angled surface. As will be clear from the following description, the recess refers to any partial removal of a sidewall connecting the first or second face of the coupling member. It may be created by moulding or by removing a part of a smooth side wall by means of cutting or machining parts of said side wall.

In an embodiment of the present disclosure, the coupling member is configured such that ultrasonic signals entering the coupling member at the first face propagate obliquely into the second face of the coupling member. In other words, the coupling member of the present disclosure not only acts as a means for avoiding air gaps between an outer surface of the fluid conduit and the transducers. Rather, the coupling member also acts as a propagation aid, which is designed such that the ultrasonic sound wave created by the respective transducer is refracted, when entering the first face of the coupling member, so as to exit the second face at an oblique angle, which is preferably also oblique to an outer face of the fluid conduit. The coupling member may thus be the only part situated between the transducer and the fluid pipe.

The first face may be directly connected to a transducer, whereas the second face may be directly connected to an outer surface of a corresponding fluid conduit. The first face may be directly moulded onto a corresponding surface of the transducer. In other embodiments, the first face may be connected to the corresponding surface of the transducer by means of an adhesive, such as Cyanoacrylate adhesive. However, it will be understood that application of any other adhesive is also feasible for as long as it does not significantly affect the ultrasonic signal.

In another embodiment, the coupling member is made from a material having a refractive index that substantially matches a refractive index of a flow medium to be measured. By matching the refractive index of the coupling member to the refractive index of the flow medium, the amount of refraction is reduced rendering the signal path more easily controllable.

The recess extending from the second face may be a retracted flat. In one embodiment, the recess may extend in a direction substantially orthogonal to the second face.

In another embodiment, at least parts of the sidewall extend substantially orthogonal to the first face. Accordingly, said orthogonal parts of the sidewall are aligned with a main direction of propagation of the ultrasonic signal. In other words, the sidewalls of the coupling member extend in a preferred direction of the ultrasonic signal to support propagation of said signal in a desired direction and to attenuate parts of the signal that divert from said preferred signal path.

The coupling member may be prism shaped. In particular, the coupling member may be a truncated, cylindrical prism with the first face being truncated at an oblique angle.

The coupling member may be made from a polymeric material.

In yet another embodiment, the recess does not intersect the first face of the coupling member. Creating a recess that would reduce the surface area of the first face of the coupling member can result in significant parts of the relevant ultrasonic signal being lost.

By creating a recess that does not intersect with the first face, the recessed coupling member of the present disclosure does not significantly affect the amount of ultrasonic signal being introduced into the coupling member and, at the same time, avoids inadvertent contact between corresponding coupling members.

The recess may comprise a plurality of concave recesses. This arrangement further assists in attenuating unwanted noise between the respective transducers.

In another embodiment, the coupling member comprises an anti-rotation member. The anti-rotation member may be formed in one piece with the coupling member and may protrude from its sidewall on an opposite end to the recess. In some embodiments, the coupling member comprises a plurality of anti-rotation members protruding from the sidewall. For example, a first anti-rotation member may protrude from the sidewall on an opposite end to the recess, whereas second and third anti-rotation members are spaced circumferentially at around 90 degrees from the first anti-rotation member. The second and third anti-rotation members may be arranged at opposite ends of the sidewall.

In another aspect of the present disclosure, there is provided a clamp on flow metering device comprising first and second coupling members as described above. First and second coupling members are arranged with respect to each other such that their respective recesses face each other and form a gap between the coupling members.

The gap may be filled with a spacer element. The spacer element may be made from a material that is stiffer than a material of the first and second coupling members. Rather than using an air gap to separate the first and the second coupling members from each other, a spacer element may be inserted to maintain the distance between the respective coupling members. As such, the spacer element, which is stiffer than the coupling members, will not deform even if the coupling members are pushed towards each other, e.g. when fixing the flow metering device to the respective fluid conduit.

The spacer element may be made from any highly sound attenuating material. In one embodiment, the spacer element is made from cork or graphite. The spacer element may be solid or hollow for as long as the stiffness is sufficient to maintain the distance or gap between the coupling members.

In another embodiment, the coupling member comprises an anti-rotation member protruding from a sidewall of the coupling member. The anti-rotation member may be ranged on a side of the coupling member, which is opposite to the recess. The anti-rotation member may be an integral part of the coupling member. The anti-rotation member detains correct alignment of the recess within the ultrasonic flow metering device.

The anti-rotation members of the first and second coupling members protrude from their respective sidewalls in substantially opposite directions.

In another embodiment, the ultrasonic flow metering device may be a clamp on flow meter.

In yet another embodiment, the ultrasonic flow metering device may be a "V-method" flow meter.

The coupling member of the present disclosure may be produced by a moulding process, e.g. liquid injection moulding. The coupling member may be directly moulded onto a corresponding surface of a respective transducer.

Alternatively, the coupling member of the present disclosure may be manufactured in successive layers on basis of layered model data by means of an additive manufacturing device. In this case, there may be provided a computer readable medium comprising instructions which, when the instructions are executed by an additive manufacturing device, cause the additive manufacturing device to carry out said additive manufacturing method.

The above layered model data may be created, comprising:
providing a coupling member of the present disclosure;
performing digital capture of shape data by scanning of at least parts of a shape of the coupling member;
converting the shape data into layered model data by dividing the shape data into a plurality of successively printable layers;
storing the layered model data in a computer readable medium.

According to another aspect of the present disclosure, there is provided a method of manufacturing a flow metering device, the flow metering device comprising an ultrasonic transducer, the method comprising:
moulding an elastic coupling member directly onto a coupling surface of the ultrasonic transducer.

Moulding an elastic coupling member directly onto a coupling surface of the ultrasonic transducer reduces the introduction of air gaps between the coupling surface and a corresponding first face of the coupling member. Air gaps may attenuate the acoustic signal produced by the transducers. Due to the reduced number or size of air gaps achieved by the above moulding process, the SNR (signal-to-noise ratio) of the acoustic signal may increase.

The elastic coupling member may be injection moulded onto the ultrasonic transducer. It should be noted that the elastic coupling member of this method may have any mouldable shape and therefore may or may not include the recess described in connection with the specific coupling member described above.

In one embodiment, the method may further comprise preparing the coupling surface with a primer before the moulding step. The primer may be any primer facilitating adhesion between the coupling surface of the transducer and the corresponding face of the coupling member during the moulding process.

The primer may be a shellac resin. In one example, the primer may be a spray-on primer.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

DESCRIPTION OF THE DRAWINGS

One or more embodiments of the disclosure will now be described, by way of example only, with reference to the accompanying drawings, in which.

DETAILED DESCRIPTION

Turning to FIGS. 2A to 2E, there are shown different views of a coupling member for flow metering devices according to an embodiment of the present disclosure. The illustrated coupling member 20 comprises a first face 22. The first face 22 is configured to be connected to ultrasonic transducer 26 as indicated by the dash lines in FIG. 2B. To this end, the first face may have a shape that matches the corresponding surface of the transducer 26. In one embodiment, said shape is a flat first face 22 that corresponds to a flat face of the transducer 26. In other embodiments, the face of the transducer may be uneven, e.g. it may comprise a shoulder portion along its circumferential edge, in which case the first face of the coupling member would match the shape of the shoulder portion inversely.

Figure 2A:
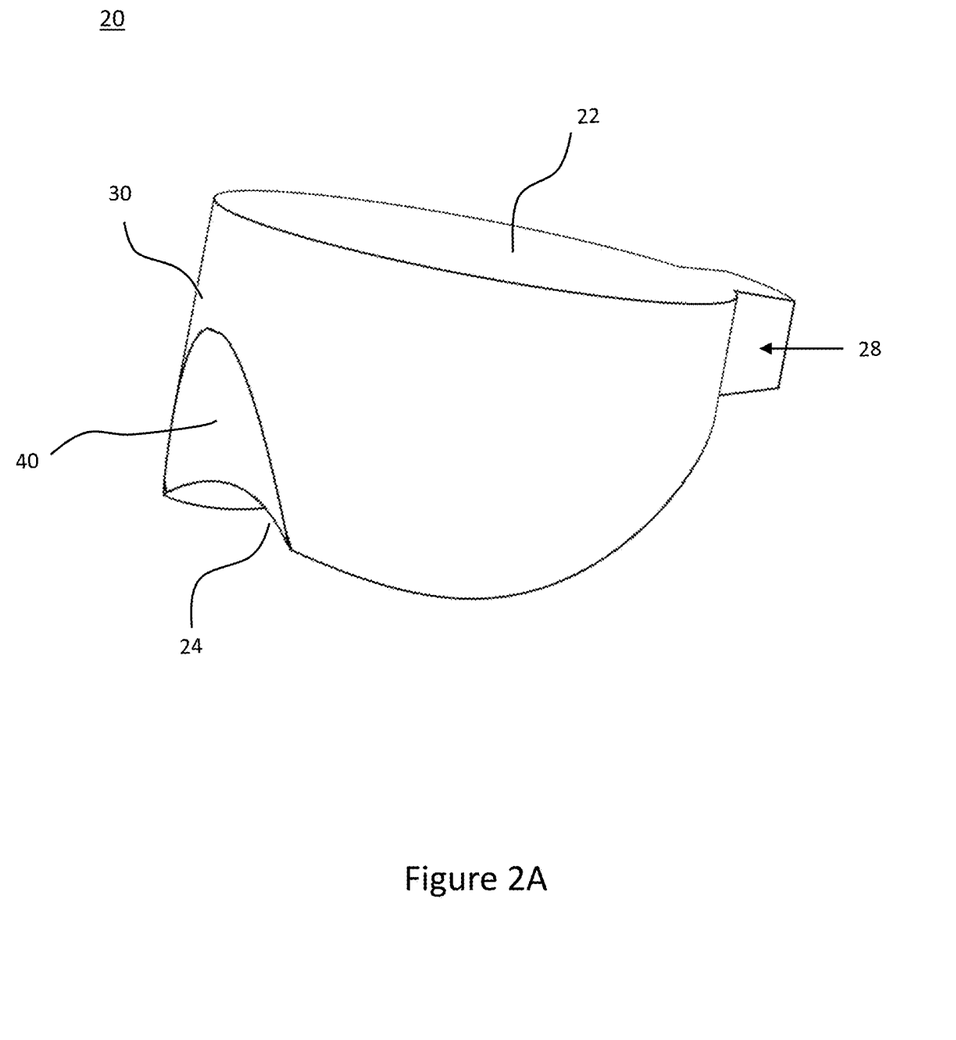
FIG. 2A is a perspective side view of a coupling member for flow metering devices according to an embodiment of the present disclosure.

The coupling member 20 comprises a second face 24. The second face 24 is configured for connecting the coupling member to a fluid conduit (see FIG. 7A). The second face 24 of the embodiment shown in FIGS. 2A to 2E has a curved shape. The curved shape is provided to match an outer surface of a variety of tubular conduits of different diameters. As is indicated in FIG. 2C, the radius R of the curvature of the second face 24 relates to the radius R of a maximum conduit size to be contacted by the coupling member 20. It will, however, be understood that the coupling member with radius R may also be used for fluid conduits of significantly smaller radius than R.

The first face 22 and the second face 24 are arranged on opposite ends of the coupling member 20. In the illustration of FIG. 2A, the first face 22 is an upper face of the coupling member 20, whereas the second face 24 is a lower face. The first and second faces 22, 24 are connected via sidewalls 30, 32, 34, and 36.

In the embodiment illustrated in FIGS. 2A to 2E, the coupling member 20 is prism shaped. More particularly, the coupling member 20 is a truncated, cylindrical prism with the first face 22 being truncated at an oblique angle. The second face 24, on the other hand, extends substantially horizontally in the flow direction.

The coupling member 20 of this embodiment is a substantially cylindrical prism with the exception of a protrusion 28, which extends from circumferential sidewall 30. The protrusion 28 defines three further sidewalls 32, 34, and 36 connecting the first face 22 with the second face 24 that is derivable from FIG. 2D, for example.

Figure 2B:
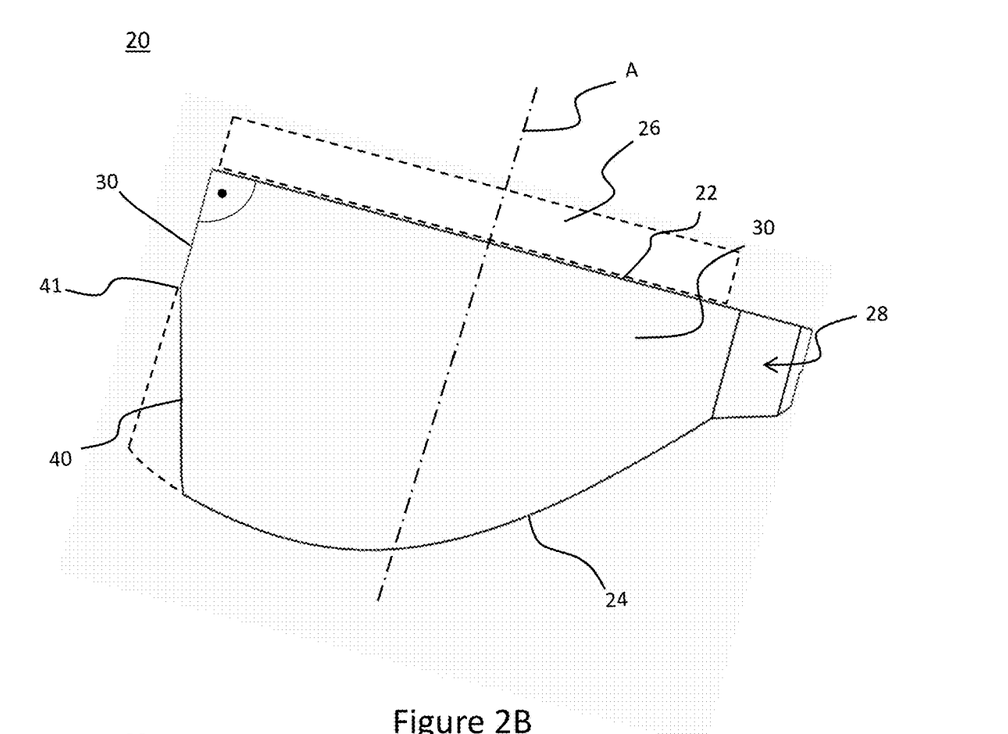
FIG. 2B shows a side view of the embodiment shown in FIG. 2A.
Figure 2C:
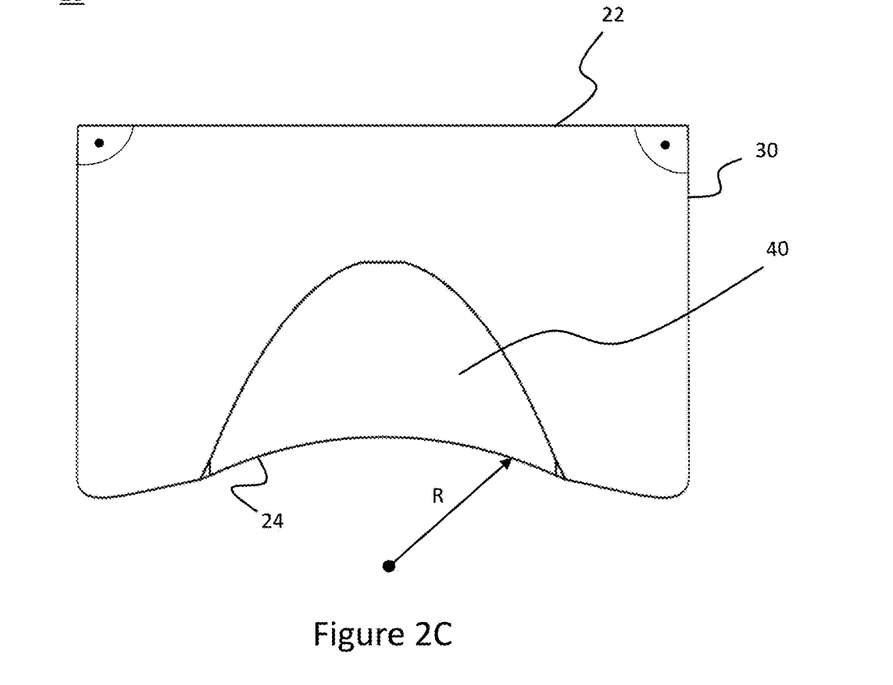
FIG. 2C shows a front view of the embodiment shown in FIG. 2A.
Figure 2D:
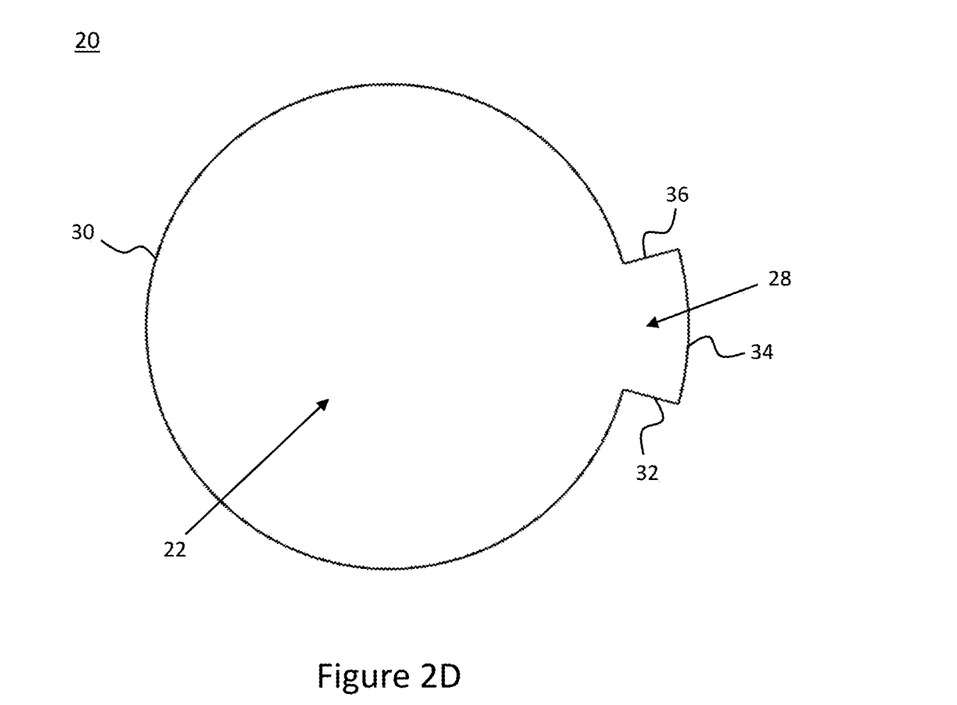
FIG. 2D shows a top view of the embodiment shown in FIG. 2A.

Turning to FIGS. 2B and 2C, it will be appreciated that at least parts of sidewall 30 extend perpendicular to the first face 22. These parts of sidewall 30, therefore, run parallel with an axis A that indicates a main line of propagation for sound waves created by the transducer 26. However, rather than the sidewall 30 extending in a perpendicular direction with respect to the first face 22 all the way to the second face 24, parts of sidewall 30 (left part in FIG. 2B/front part in FIG. 2C) comprise a recess 40 extending from the second face 24.

In the illustrated embodiment, recess 40 is a retracted flat. The recess 40 in the form of a retracted flat extends in a direction, which is substantially perpendicular to the second face 24.

The recess 40 shortens the extent of the second face 24 as compared to an entirely straight sidewall 30 as indicated by the dashed lines in FIG. 2B. As will be described in more detail with reference to FIGS. 7A and 7B, the recess, therefore, facilitates the provision of an air gap between two coupling members arranged on the same side of a fluid conduit.

It should be understood that the recess 40 does not necessarily need to be in the form of a retracted flat. Rather, other embodiments might include a curved, stepped surface. As highlighted by the dashed line in FIG. 2B, the recess 40 refers to any partial removal of a smooth sidewall connecting the first or second face 22, 24 of the coupling member 20. It may be created by moulding or by means of cutting or machining parts of said side wall to create a corresponding cut-out.

In FIG. 2B, the dashed line together with the upper-left part of side wall 30 (the part that is perpendicular to first face 22) shows an example of what is meant by the term "smooth side wall". In this case, a "smooth side wall" would extend in a straight line between edges of the first and second face. It will be appreciated that a smooth side wall may also be curved rather than straight but does not include any sharp edges. Accordingly, the term "smooth" may be interpreted in a mathematical sense.

The recess 40 changes the direction of the sidewall and thus introduces a sharp turning point 41 into the cross-section of side wall 30.

Expressed in an alternative way, the recess changes the direction of at least parts of the side wall 30 in such a way that the size of the second face 24 is reduced as compared to the straight or smooth extend of the side wall, indicated by the dashed line on the bottom-left corner of FIG. 2B.

Figure 2E:
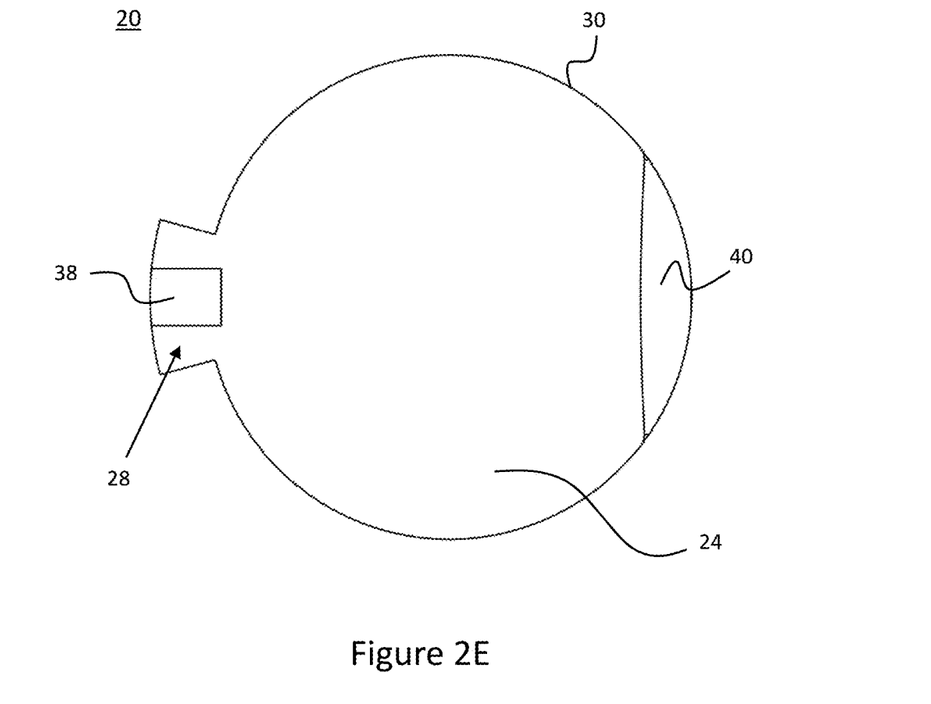
FIG. 2E shows a top view of the embodiment shown in FIG. 2A.

FIG. 2E shows a bottom plan view of the coupling member 20. From this illustration, it is visible that the protrusion 28 has a dove tail shape and includes a second recess 38 extending from the second face 24 and creating a receptacle for a variety of sensors, such as temperature sensors for measuring the temperature of the outer surface of the fluid conduit, which is a measure for the temperature of the fluid within the conduit. The second recess is arranged on the second face 24, such that the elastic nature of the coupling member 20 will push a corresponding temperature sensor against the outer surface of the fluid conduit as the flow metering device is attached to the latter, thereby preventing air gaps between the temperature sensor and the conduit. At the same time, the dove tail shaped protrusion 28 may be used as an anti-rotation element to facilitate correct alignment of the coupling member 20 in a housing of a corresponding flow metering device.

Figure 3A:
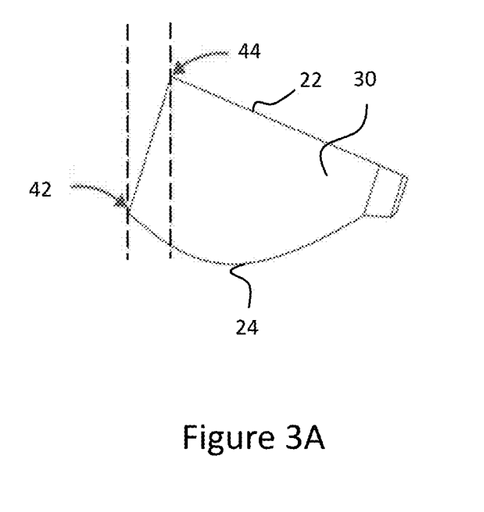
FIGS. 3A and 3B show a possible range of recess arrangements according to an embodiment of the present disclosure.
Figure 3B:
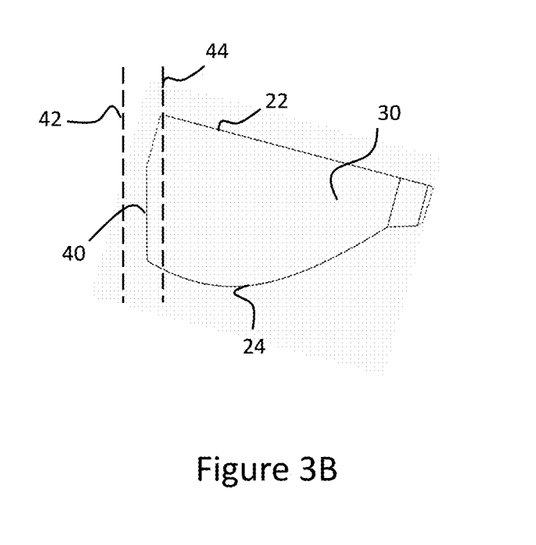

Turning to FIGS. 3A and 3B, there is shown a range of possible extents for the recess 40. The range is defined by limits 42 and 44 shown in FIGS. 3A and 3B. The first threshold 42 relates to a case in which the sidewall 30 is cylindrical all the way between the first face 22 and second face 24. It will be understood that in this scenario shown in FIG. 3A, no recess will be created.

FIG. 3B shows a recess 40 per the embodiment shown in FIGS. 2A to 2E, which is situated between the first and second limits 42 and 44. The second limit 44 is set to ensure that the recess 40 will not intersect the first face 22 of the coupling member 20. If the recess 40 went beyond the second limit 44 and therefore intersected the first face 22, the ultrasonic signal created by the transducer 26 (FIG. 2B) would be significantly affected, resulting in an increased risk of receiving non-usable signals at a corresponding, receiving transducer.

The recessed shape of the coupling member of the present disclosure also has advantages when the coupling member is compressed. It will be understood that compression of the coupling member can occur when a corresponding flow metering device, and in particular a clamp-on flow metering device, is attached to the outer surface of a respective fluid conduit. This will result in compressing the elastic coupling member, which is located between the transducer and the fluid conduit, against the outer surface of the fluid conduit to close potential air gaps between the second face of the latter and an outer surface of the fluid conduit.

Figure 4:
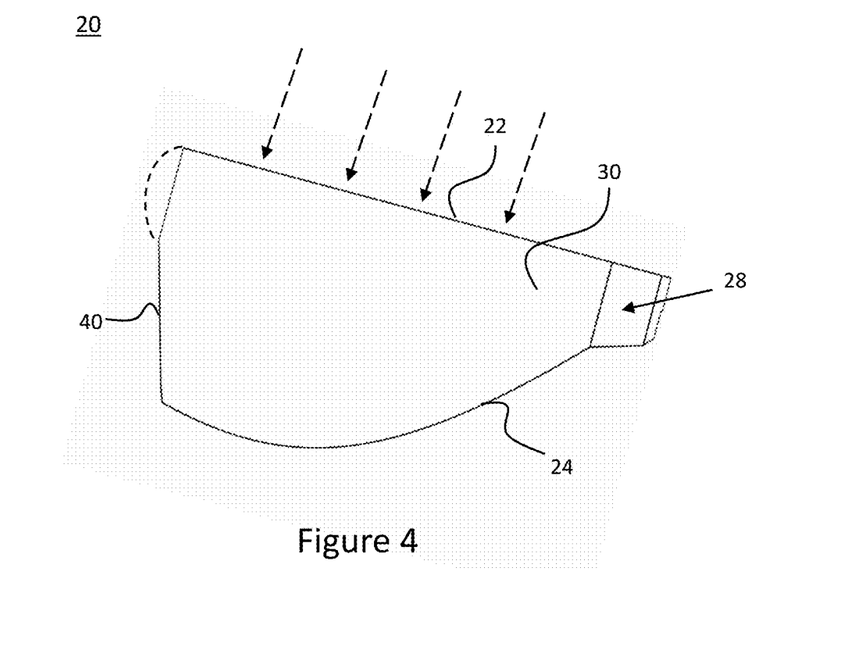
FIG. 4 shows a side view of the embodiment shown in FIG. 2A under compression.

FIG. 4 shows, schematically, the effect of compressing the coupling member 20 according to the embodiment shown in FIGS. 2A to 2E. As a force is applied on coupling member 20, pushing the first face 22 and the second face 24 closer together, expansion of the sidewall 30 in a direction mainly perpendicular to the direction of the compressive force occurs. It has been found that, due to the provision of the recess 40 along sidewall 30, expansion of the coupling member 20 in the lateral direction mainly occurs in parts of the sidewall 30, which are not recessed, as can be derived from the dashed line in FIG. 4. In other words, most of the expansion occurs in the section of the sidewall 30, which is not recessed and arranged adjacent to the first face 22. The recessed surface, which extends from the second face 24, does not expand significantly compared to the non-recessed part of the sidewall 30. This phenomenon is particularly prominent in embodiments in which the recess 40 extends substantially perpendicular to the second face 24. As mentioned above, by inhibiting expansion of the coupling member, particularly in regions close to the second face 24, it is possible to avoid inadvertent contact between two adjacent coupling members, which would otherwise result in increased cross-talk.

Figure 5:
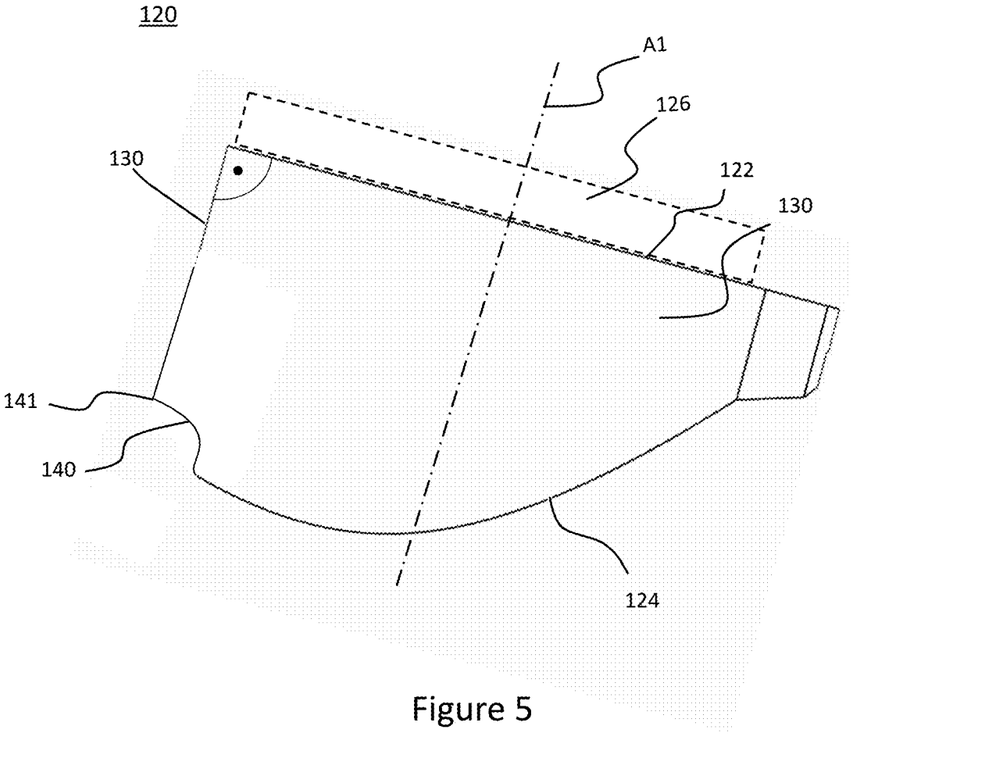
FIG. 5 shows a side view of a coupling member according to another embodiment of the present disclosure.

Turning to FIG. 5, there is shown a side view of a coupling member for flow metering devices according to another embodiment of the present disclosure. It will be appreciated that the coupling member 120 is mostly identical to the coupling member 20 of FIGS. 2a to 2E except for the recess 140.

The illustrated coupling member 120 comprises a first face 122. The first face 122 is configured to be connected to ultrasonic transducer 126 as indicated by the dash lines in FIG. 5. To this end, the first face 122 may have a shape that matches the corresponding surface of the transducer 126. In the present embodiment, said shape is a flat first face 122 that corresponds to a flat face of the transducer 126.

The coupling member 120 comprises a second face 124. The second face 124 is configured for connecting the coupling member to a fluid conduit (see FIG. 7A). The second face 124 has a curved shape. The curved shape is provided to match an outer surface of a variety of tubular conduits of different diameters.

The first face 122 and the second face 124 are arranged on opposite ends of the coupling member 120. In the illustration of FIG. 5, the first face 22 is an upper face of the coupling member 120, whereas the second face 24 is a lower face. The first and second faces 22, 124 are connected via sidewall 130.

At least parts of sidewall 130 extend perpendicular to the first face 22. These parts of sidewall 130, therefore, run parallel with an axis A1 that indicates a main line of propagation for sound waves created by the transducer 126. However, rather than the sidewall 130 extending in a perpendicular direction with respect to the first face 22 all the way to the second face 124, parts of sidewall 30 comprise a recess 140 extending from the second face 124.

In the embodiment of FIG. 5, recess 140 is a curved recess. The curved recess 140 shortens the extent of the second face 24 as compared to an entirely straight sidewall 30. Therefore, the recess 140 facilitates the provision of an air gap between two coupling members arranged on the same side of a fluid conduit.

It should be understood that the recess 140 does not necessarily need to be in the form shown in FIG. 5. In some embodiments, the recess 140 can include any curved, stepped surface. The recess 140 can refer to any partial removal of a smooth sidewall connecting the first and second face 122, 124 of the coupling member 120. It may be created by moulding or by means of cutting or machining parts of said side wall to create a corresponding cut-out.

The recess 140 changes the direction of the sidewall 130 and, in this example, introduces a sharp turning point 141 into the cross-section of side wall 130. The recess 140 changes the direction of at least parts of the side wall 130 in such a way that the size of the second face 124 is reduced as compared to a straight or "smooth" non-recessed side wall. The recess 140 can also be considered as defining a surface that is obliquely angled with reference to the axis A1 that indicates the main line of propagation for sound waves through the coupling member 120.

Figure 6:
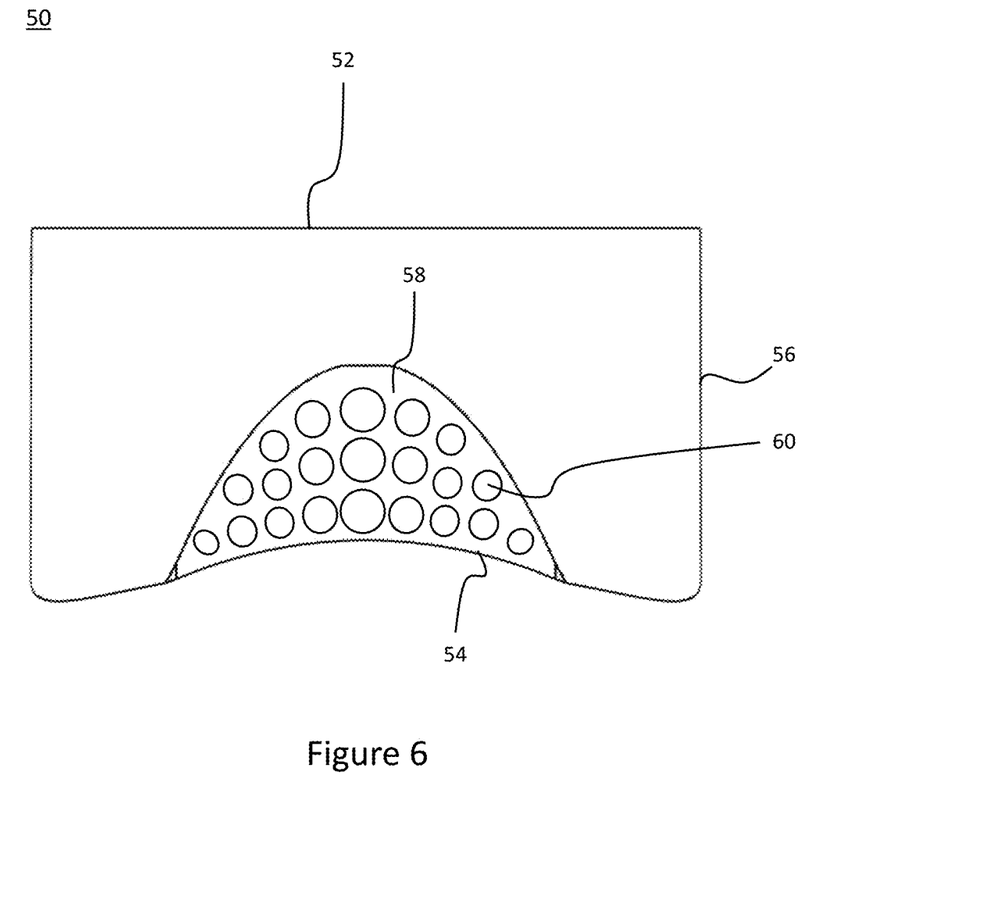
FIG. 6 shows a front view of a coupling member according to another embodiment of the present disclosure.

FIG. 6 shows a front view of a coupling member 50 according to another embodiment of the present disclosure. The coupling member 50 shown in FIG. 6 includes a first face 52 adapted for connection to an ultrasonic transducer and an opposite second face 54 configured for connection to the outer surface of a fluid conduit. A sidewall 56 connects the first face 52 to the second face 54. At least parts of the sidewall 56 include a recess 58, similar to recess 40 described with respect to the embodiment shown in FIGS. 2A to 2E. However, in contrast to recess 40, recess 58 comprises a plurality of concave recesses 60. Accordingly recess 58 creates a surface, which is comparable to a golf ball, with the exception that the concave recesses 60 may have varying diameters. The additional concave recesses 60 further attenuate noise signals and are shaped to trap the sound waves of the noise signal within them. It will be appreciated that other shapes, such as a plurality of triangular recesses (not shown), may alternatively also be used to further reduce the noise signals.

Figure 7A:
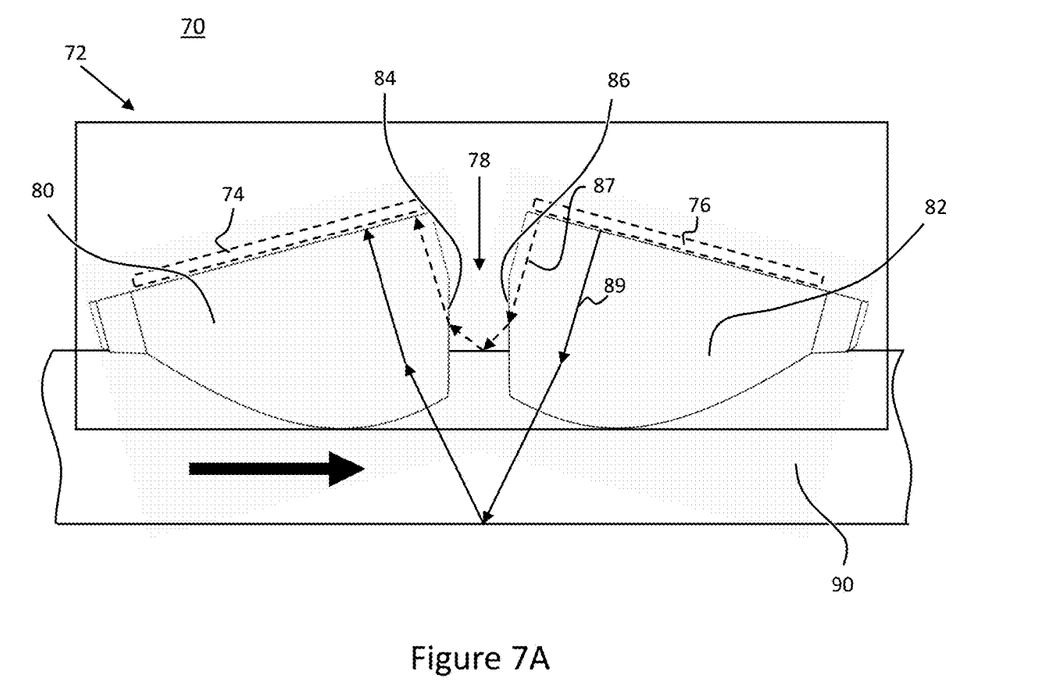
FIG. 7A shows an embodiment of the ultrasonic flow metering device according to the present disclosure.
Figure 7B:
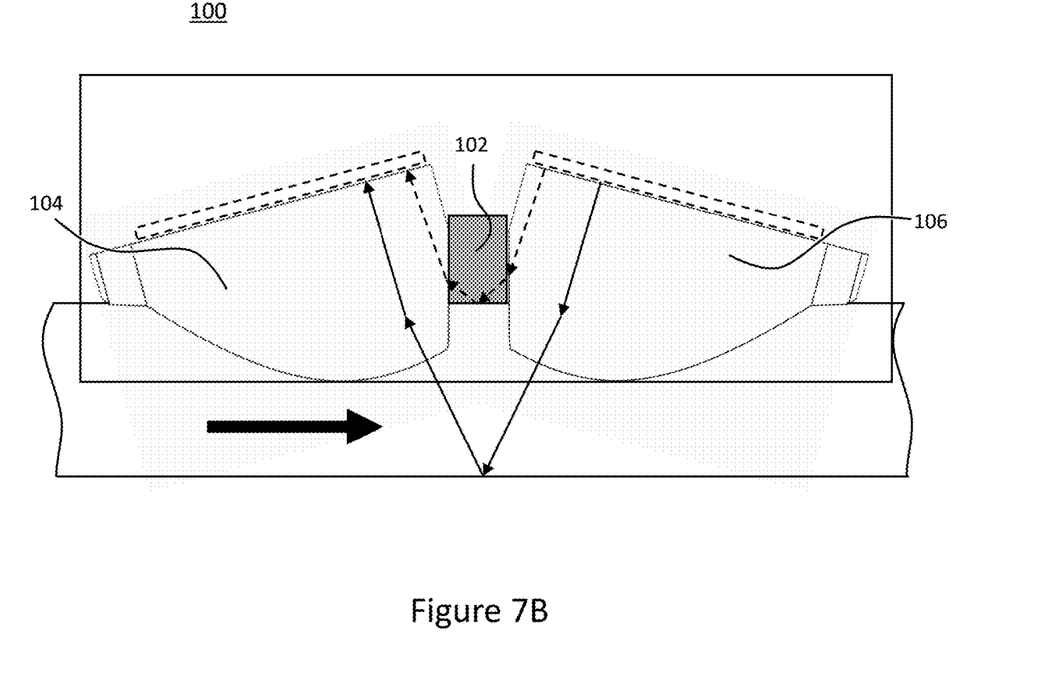
FIG. 7B shows another embodiment of the ultrasonic flow metering device according to the present disclosure.

Turning to FIGS. 7A and 7B, there are shown two embodiments of an ultrasonic flow metering device in accordance with the present disclosure.

In a first embodiment shown in FIG. 7A, the ultrasonic flow metering device 70 includes a housing 72 for supporting first and second transducers 74, 76 and respective first and second coupling members 80, 82. The coupling members 80 and 82 in this embodiment are both shaped per the embodiment shown in FIGS. 2A to 2E.

The first transducer 74 is arranged within the housing 72 in such a way that it is directly connected to the first face of the first coupling member 80. The second transducer 76 is received within the housing 72 such that it is directly connected to the first face of the second coupling member 82. The second faces of the two coupling members 80, 82 are pressed against the outer surface of a fluid conduit 90. The first and second transducers 74, 76 are arranged on the same side of the fluid conduit 90 and offset along the longitudinal direction of said fluid conduit 90.

The first and second coupling members, 80, 82 are arranged within the housing 72 such that their respective recesses 84, 86 face each other and create a gap 78 there between. In this embodiment, gap 78 is an air gap, which acts to weaken unwanted noise signals 87 that do not enter flow conduit 90 before being received by the respective other transducer. Only ultrasonic wave signals 89 that enter the conduit 90 and are reflected back to the receiving transducer will cross the air gap with full signal strength. The gap 78 shown in FIG. 7A can, therefore, be considered as an attenuating gap acting to reduce noise signals 87 and improve the quality of the ultrasonic signal received by the transducers 74, 76.

It will be understood that both transducers 74 and 76 may work as both transmitters and receivers, at different times during the flow metering process. Both transducers 74 and 76 of the depicted embodiment can, therefore, also be described as transceivers. Accordingly, signals 87 and 89 also travel in a direction opposite to the arrows shown in FIG. 7A.

It should also be understood that the housing 72 is only represented as a transparent black box and may include further components such as power supply and signal lines for connecting the transducers 74 and 76 to a control unit not shown. Of course, the connection between the transducers 74 and 76 and a corresponding control unit may also be realized wirelessly, in which case the housing 72 further includes a wireless communication device connected to the transducers 74, 76.

Finally, FIG. 7A shows that the protrusions of the two coupling members 80, 82 extend in substantially opposite directions. The protrusions are fixed within the housing such that they act as anti-rotation members ensuring that the coupling members 80 and 82 are always aligned with each other in such a way that the recessed surfaces face each other.

Another embodiment of an ultrasonic flow metering device 100 according to the present disclosure is shown in FIG. 7B. The ultrasonic flow metering device 100 of FIG. 7B is substantially identical to the flow metering device 70 of FIG. 7A. However, rather than providing an air gap 78 between the coupling members, a spacer element 102 is arranged within the gap. The spacer element may be made from a material that is stiffer than a material of the first and second coupling members 104, 106. Accordingly, the spacer element 102 will ensure that the gap between the first and second coupling members 104, 106 will be maintained even if the coupling members 104, 106 are compressed and try to expand towards each other. At the same time, the spacer element 102 acts to attenuate the noise signals, due to its shape and material. The spacer element 102 may be a hollow box and made from a highly attenuating material, such as cork.

Figure 8A:
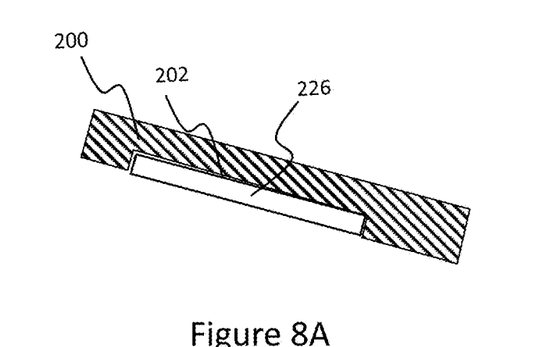
FIGS. 8A to 8D schematically illustrate steps of a method for manufacturing a flow metering device.
Figure 8B:
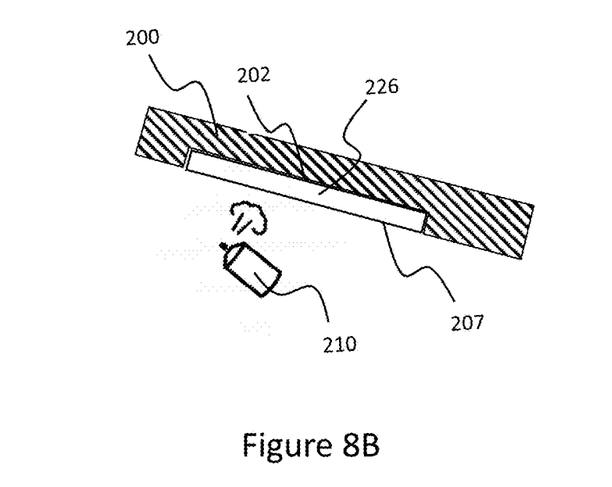
Figure 8C:
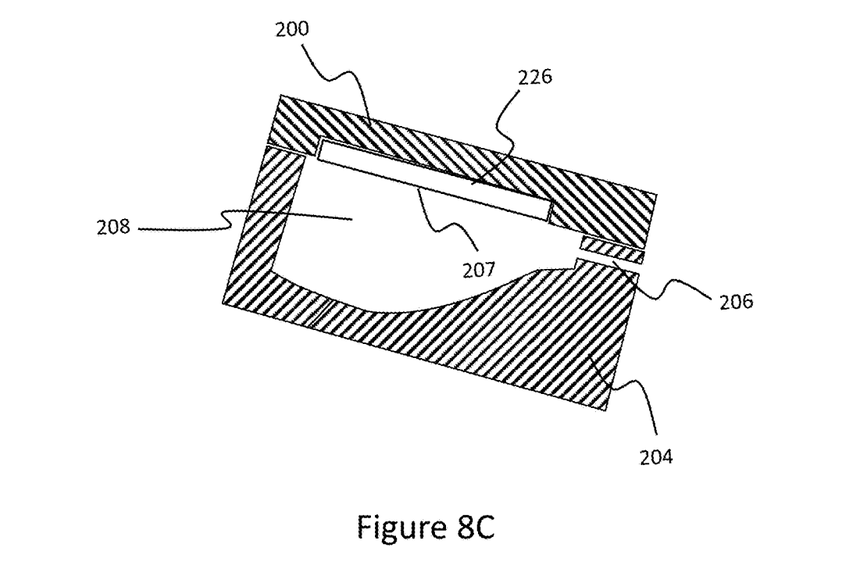

FIGS. 8A to 8D schematically illustrate a method for manufacturing a flow metering device. In particular, the steps shown in FIGS. 8A to 8C schematically illustrate a method for moulding an elastic coupling member directly onto a corresponding transducer to form a transducer module. Moulding the elastic coupling member directly onto the transducer may advantageously reduce the number and/or volume of air gaps between the transducer and the coupling member. Air gaps may attenuate the acoustic signal produced by the transducers. Due to the reduced number or size of air gaps achieved by the described method, the SNR (signal-to-noise ratio) of the acoustic signal may increase.

Turning to FIG. 8A, there is shown a schematic representation of an A-plate 200 that forms part of a mould. The A-plate 200 comprises a first cavity 202. The first cavity 202 is sized and shaped to receive a transducer 226 of the flow metering device. In other words, the shape of the first cavity 202 of the A-plate 200 matches the shape of the transducer 226.

The transducer 226 is inserted and held within the first cavity 202 of the A-plate 200. The transducer 226 may be retained within the first cavity 202 by any known means, such as fastening members, particularly fastening screws or bolts arranged on the A-plate 200. Of course it may also be possible to retain the transducer in other ways, such as by means of a press-fit between the cavity and the transducer or geometric retaining structures, such as back tapers.

FIG. 8B illustrates a second step, in which a coupling surface 207 of the transducer is prepared for the moulding process with a primer 210. In the illustration of FIG. 8B, the primer is a spray-on primer, such as Shellac resin. The primer may be automatically or manually applied to the coupling surface 207 of the transducer 226. Of course, any other form of primer may be used to prepare the coupling surface 207. In some embodiments, a primer may not be required at all.

Turning to FIG. 8C, the A-plate 200 of the mould is connected with a B-plate 204 to form the mould for adding the elastic coupling member to the coupling surface 207 of the transducer 226. The B-plate 204 comprises a second cavity 208 with an opening facing the coupling side 207 of the transducer 226. As will be appreciated, the shape of the second cavity 208 represents an inverse of the shape of a desired coupling member. The second cavity 208 may be connected, in a known way, to a runner 206 for injecting elastomeric material into the second cavity 208. Once the elastomeric material is injected into the second cavity 208, the elastic coupling member is formed and, at the same time, connected to the coupling surface 207 of the transducer 226.

When the injected elastomeric material has set, the transducer module comprising the transducer 226 and a corresponding coupling member (e.g. coupling member 220 shown in FIG. 8D), is ejected from the mould. The transducer module may then be inserted into a housing of the flow metering device, as will be described in more detail with reference to FIG. 8D.

Figure 8D:
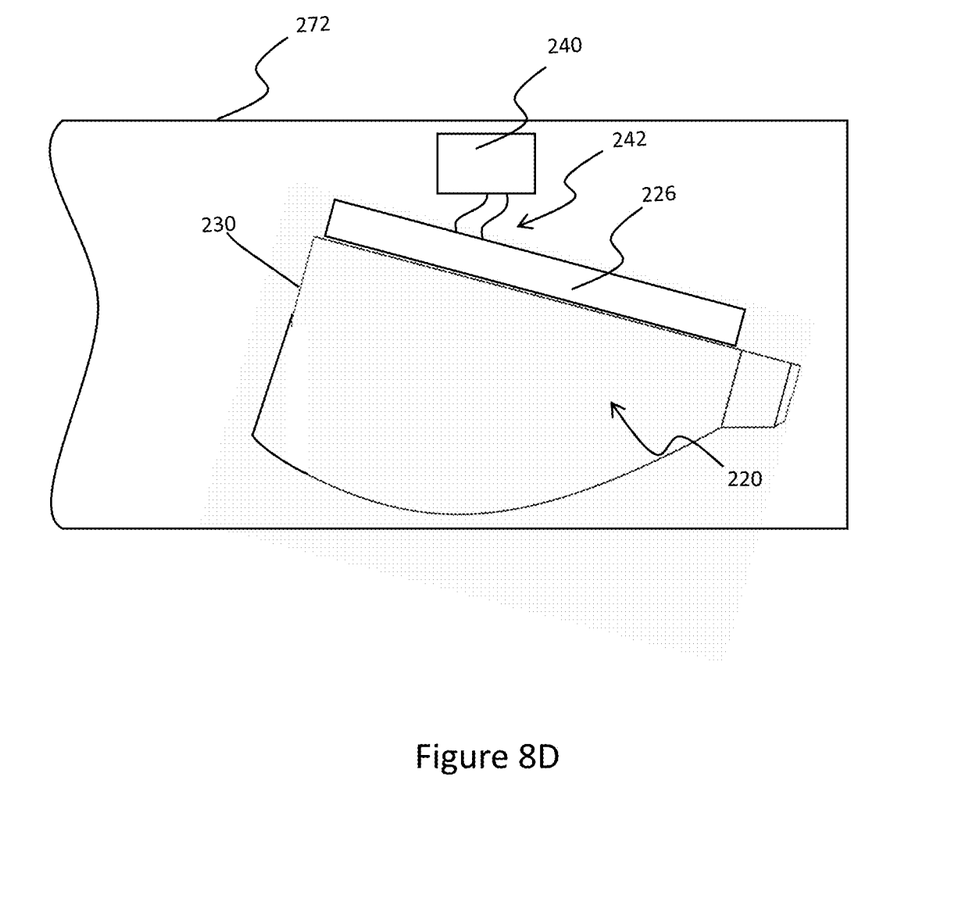

FIG. 8D schematically shows parts of a flow metering device of the present disclosure. FIG. 8D shows a part of a housing 272 of a flow metering device in which a first transducer module comprising the transducer 226 and the coupling member 220 is received. Similar to the embodiments described with reference to FIGS. 7A and 7B, the housing 272 may also comprise a second transducer module, which is not shown in FIG. 8D for simplicity. The transducer module produced by the injection moulding process illustrated in FIGS. 8A to 8C may be inserted into corresponding cavities of the housing 272. The cavities may match the shape of the transducer module.

The housing 272 may include a processor 240 that may function as or communicate with a control unit for providing and/or analyzing ultrasonic signals. The transducer 226 may be connected to the processor 240 via one or more data connections 242.

The invention claimed is:
1. An ultrasonic flow metering device comprising:
a first coupling member, the first coupling member being elastic and configured for acoustically coupling a first ultrasonic transducer to a fluid conduit, the first coupling member comprising:

a first face adapted to be connected to the first ultrasonic transducer and a second face adapted to be connected to the fluid conduit;

at least one first sidewall connecting the first and second faces, wherein the at least one sidewall comprises a first recess extending from the second face;

a second coupling member, the second coupling member being elastic and configured for acoustically coupling a second ultrasonic transducer to the fluid conduit, the second coupling member comprising:

a third face adapted to be connected to the second ultrasonic transducer and a fourth face adapted to be connected to the fluid conduit; and at least one second sidewall connecting the third and fourth faces, wherein the at least one second sidewall comprises a second recess extending from the fourth face;

wherein the first and second coupling members are arranged with respect to each other such that the first recess and the second recess face each other and form a gap between the first and second coupling members, and such that contact between the first and second coupling members, that would occur in the absence of the first recess and the second recess, is avoided.

2. The ultrasonic flow metering device of claim 1, wherein the first and second coupling members are configured such that ultrasonic signals entering the coupling member at the first face propagate obliquely into the second face of the coupling member.

3. The ultrasonic flow metering device of claim 1, wherein the first and second coupling members are made from a material having a refractive index that substantially matches a refractive index of a flow medium to be measured.

4. The ultrasonic flow metering device of claim 1, wherein each of the first recess and the second recess comprises a retracted flat.

5. The ultrasonic flow metering device of claim 4, wherein the retracted flat of the first coupling member extends in a direction substantially orthogonal to the second face and the retracted flat of the second coupling member extends in a direction substantially orthogonal to the fourth face.

6. The ultrasonic flow metering device of claim 1, wherein at least a part of the first side wall extends substantially orthogonal to the first face and at least a part of the second side wall extends substantially orthogonal to the third face.

7. The ultrasonic flow metering device of claim 1, wherein the first and second coupling members are prism shaped.

8. The ultrasonic flow metering device of claim 1, wherein the first and second coupling members are made from a polymeric material.

9. The ultrasonic flow metering device of claim 1, wherein the first recess does not intersect the first face.

10. The ultrasonic flow metering device of claim 1, wherein the first recess comprises a plurality of concave recesses.

11. The ultrasonic flow metering device of claim 1, wherein the first coupling member further comprises an anti-rotation member.

12. The ultrasonic flow metering device of claim 11, wherein the anti-rotation member is dove-tail shaped.

13. The ultrasonic flow metering device of claim 12, wherein the gap is filled with a spacer element.

14. The ultrasonic flow metering device of claim 13, wherein the spacer element is made from a material that is stiffer than a material of the first and second coupling members.

15. The ultrasonic flow metering device of claim 1, wherein the first coupling member comprises a first anti-rotation member and the second coupling member comprises a second anti-rotation member, wherein the first anti-rotation member protrudes from the at least one first sidewall in a first direction, and the second anti-rotation member protrudes from the at least one second sidewall in a second direction substantially opposite the first direction.

16. The ultrasonic flow metering device of claim 1, wherein the ultrasonic flow metering device is a clamp on flow meter.

17. The ultrasonic flow metering device of claim 1, further comprising:

a housing, wherein the housing supports the first and second ultrasonic transducers and the first and second coupling members such that they are arranged with respect to each other such that the first recess and the second recess face each other and form the gap between the first and second coupling members.

18. The ultrasonic flow metering device of claim 1, wherein the first and second coupling members each comprise an anti-rotation member that retain correct alignment of the respective recesses within the ultrasonic flow metering device.

* * * * *